Figure 1:
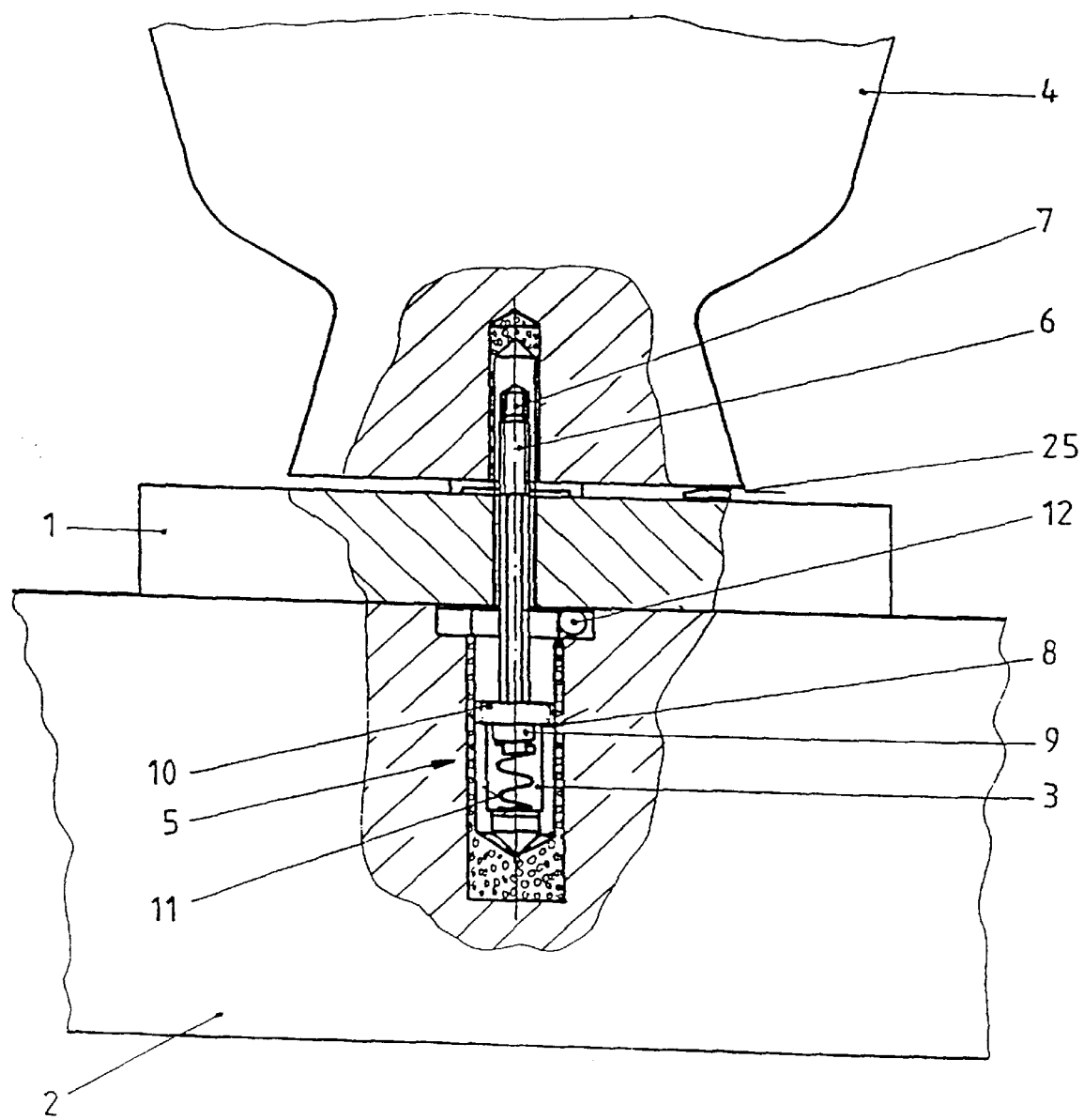

United States Patent

Frank

[11] Patent Number: 5,904,008
[45] Date of Patent: May 18, 1999

[54] GRAVESTONE ASSEMBLY

[75] Inventor: Jürgen Leonhard Frank, Bad Nauheim, Germany

[73] Assignee: Frank-System-Dübel GmbH, Bad Nauheim, Germany

[21] Appl. No.: 08/894,850

[22] PCT Filed: Dec. 11, 1996

[86] PCT No.: PCT/DE96/02373

§ 371 Date: Nov. 12, 1997

§ 102(e) Date: Nov. 12, 1997

[87] PCT Pub. No.: WO97/21891

PCT Pub. Date: Jun. 19, 1997

[30] Foreign Application Priority Data

Dec. 12, 1995 [DE] Germany ............. 195 46 278

[51] Int. Cl.[6] ...................................... E01F 9/011
[52] U.S. Cl. .............. 52/103; 74/424.8 R; 411/402; 411/919; 403/322.3
[58] Field of Search ............... 52/103; 403/322.3, 403/322.1; 411/389, 402, 919; 74/89.15, 424.8 R

[56] References Cited

U.S. PATENT DOCUMENTS

| | | | |
|---|---|---|---|
| 3,279,133 | 10/1966 | De Korte | 52/103 |
| 3,367,426 | 2/1968 | Laverty | 52/103 X |
| 3,878,042 | 4/1975 | Curulla et al. | 411/402 X |
| 4,530,618 | 7/1985 | Stoll | 403/322.1 |

FOREIGN PATENT DOCUMENTS

| | | |
|---|---|---|
| 2 651 815 | 3/1991 | France. |
| 36 16 012 A1 | 6/1987 | Germany. |
| 37 18 056 | 12/1988 | Germany. |
| 39 15 683 A1 | 11/1990 | Germany. |

*Primary Examiner*—Creighton Smith
*Attorney, Agent, or Firm*—Evenson, McKeown, Edwards & Lenahan, PLLC

[57] ABSTRACT

The invention concerns a gravestone assembly comprising a base with a gravestone detachably secured thereon by a securing arrangement. Disposed in the base is a threaded spindle which, when a gravestone is not mounted on the base is pretensioned by a spring in a position such that it projects out of the base on the gravestone side and is secured by a stop. As a result, the threaded spindle can be displaced with its upper end, which projects out of the base, against the force of the spring into the base and the foundation tube. In order to screw in the threaded spindle projecting out of the base, the gravestone has a threaded bore in its underside. The threaded spindle also projects downwards out of the base and is designed there such that it can be actuated by a turning device.

10 Claims, 3 Drawing Sheets

GRAVESTONE ASSEMBLY

The invention relates to a monument with a base and a gravestone releasably fastened thereon by a fastening device which has a threaded bore in its bottom.

A monument of the above kind is subject of DE-A-36 16 012. This document describes a monument in which a gravestone is secured on a base by means of locking projections which enter a locking opening when the gravestone is slightly shifted. Such a monument makes it possible to fasten the gravestone on the base in a simple manner and to release it therefrom if necessary. It has been found disadvantageous, however, that the means for releasably fastening the gravestone on the base have to be made with great accuracy, and that damage can be done very easily to the locking projections when the gravestone is placed on the base, in that the locking projections can be bent by the weight of the gravestone.

The above-mentioned DE-A-36 16 012 also describes as state of the art a gravestone in which a bolt is screwed from underneath through the base into a threaded bore in the gravestone. Such a monument has the disadvantage that a large space has to be created under the base for the insertion and tightening of the bolt. This necessitates extensive digging into a grave whenever the gravestone has to be removed from the base temporarily for inscription and transported to the stone mason.

The invention is addressed to the problem of developing a monument of the kind described above, in which the gravestone is reliably fastened releasably to the base, without the need for digging a large space beneath the base to reach the fastening, and without the danger of damage to the fastening means when the gravestone is placed on the base.

This problem is solved according to the invention in that a threaded spindle is disposed in the base, which when the gravestone is not mounted is biased by a spring to a position established by an abutment wherein it protrudes from the base on the gravestone side, and by its upper end protruding from the base it is displaceable into the base against the force of the spring, and for the purpose of driving the upper end of the threaded spindle protruding upward out of the base into threaded bore, the threaded spindle extends downward out of the base where it is configured for engagement by a turning means.

In order to fasten or release the gravestone from such a monument no great space need be provided under the base to enable a bolt to be passed through the base and into the gravestone, since the spindle provided for this purpose always forms a unit with the base. To turn this threaded spindle underneath the base with a turning means no more than a relatively small free space is needed. Since according to the invention the threaded spindle is biased upwardly by a spring, it is pressed down into the base when the gravestone is placed on it, so that it can never be damaged. When the spindle is turned, however, the biasing of the spindle causes the latter to be screwed into the threaded bore in the gravestone, and when its abutment is reached it draws the gravestone tightly onto the base.

Gravestone bases often differ in thickness. This could be compensated by using threaded spindles of different length. However, even for bases of different thickness, threaded spindles of always the same length can be used if, according to an advantageous embodiment of the invention, the bottom part of the spindle reaches into an internally threaded foundation tube to be embedded into the gravestone's foundation, and if the abutment that determines the length to which the spindle protrudes from the base is set by an externally threaded round nut which engages the internal thread of the foundation tube, and by which the spindle is guided with clearance and against which the spindle can be driven by its head from underneath.

The cost of the manufacture of the fastening means is especially low if, according to another embodiment of the invention, the head is constituted by a nut threaded onto the spindle and secured against rotation.

Unintentional rotation of the round nut, and consequently the rotation of the spindle after its head abuts against the round nut, can be prevented simply by providing at least one slip washer between the head and the round nut.

The rotation of the threaded spindle will involve particularly little effort if the spindle has a drive portion below the base, in the form of a hexagon, for example. The spindle can then be rotated with a common open-end wrench by pushing the latter through a narrow gap to the threaded spindle.

The free space beneath the base can be especially small if the turning means is a drive disposed on the bottom of the base, which has a drive wheel through which the turning portion of the threaded spindle passes axially. Such a drive can be driven with a simple rod in a protective tube by rotation of the rod which runs underneath the base to, for example, the back of the base.

To enable the threaded spindle to enter the threaded bore in the gravestone it is necessary that the threaded bore be precisely in line with the threaded spindle after the gravestone is placed. This can be reliably achieved according to another embodiment of the invention if on the bottom of the gravestone, coaxial with the threaded bore, a flange-like, upper centering disk with a downwardly projecting margin is provided, and a lower centering disk is disposed accordingly on the top side of the base coaxially with the threaded spindle. It is due to this margin that the effect occurs that the gravestone in the correct position audibly snaps over the lower centering disk and this snapped-in position can be discerned by the thickness of the seam between the top of the base and the bottom of the gravestone.

For the further simplification of the monument it is helpful if the threaded bore is provided in a sleeve inserted into a bore in the gravestone, if the upper centering disk likewise enters into this bore, and if the lower centering disk is fixed in a bore passing through the base and intended for the insertion of the threaded spindle.

The force of the spring biasing the threaded spindle upward is varied by adjusting the abutment to adapt to bases of different thickness, if according to another embodiment of the invention a spring cup accommodating the spring is fastened within the foundation tube at the end remote from the gravestone, against the bottom of which the spring thrusts. Such an embodiment makes it possible to use always springs of the same length regardless of the thickness of the base.

It is also desirable for the abutment to be an axially resilient component. This brings it about that the bias of the gravestone toward the base by means of the threaded spindle remains the same even in the event of temperature fluctuations.

The invention admits of numerous embodiments. For further explanation of its basic principle, one of them is represented in the drawing and described hereinafter.

The drawing shows in

Figure 2:
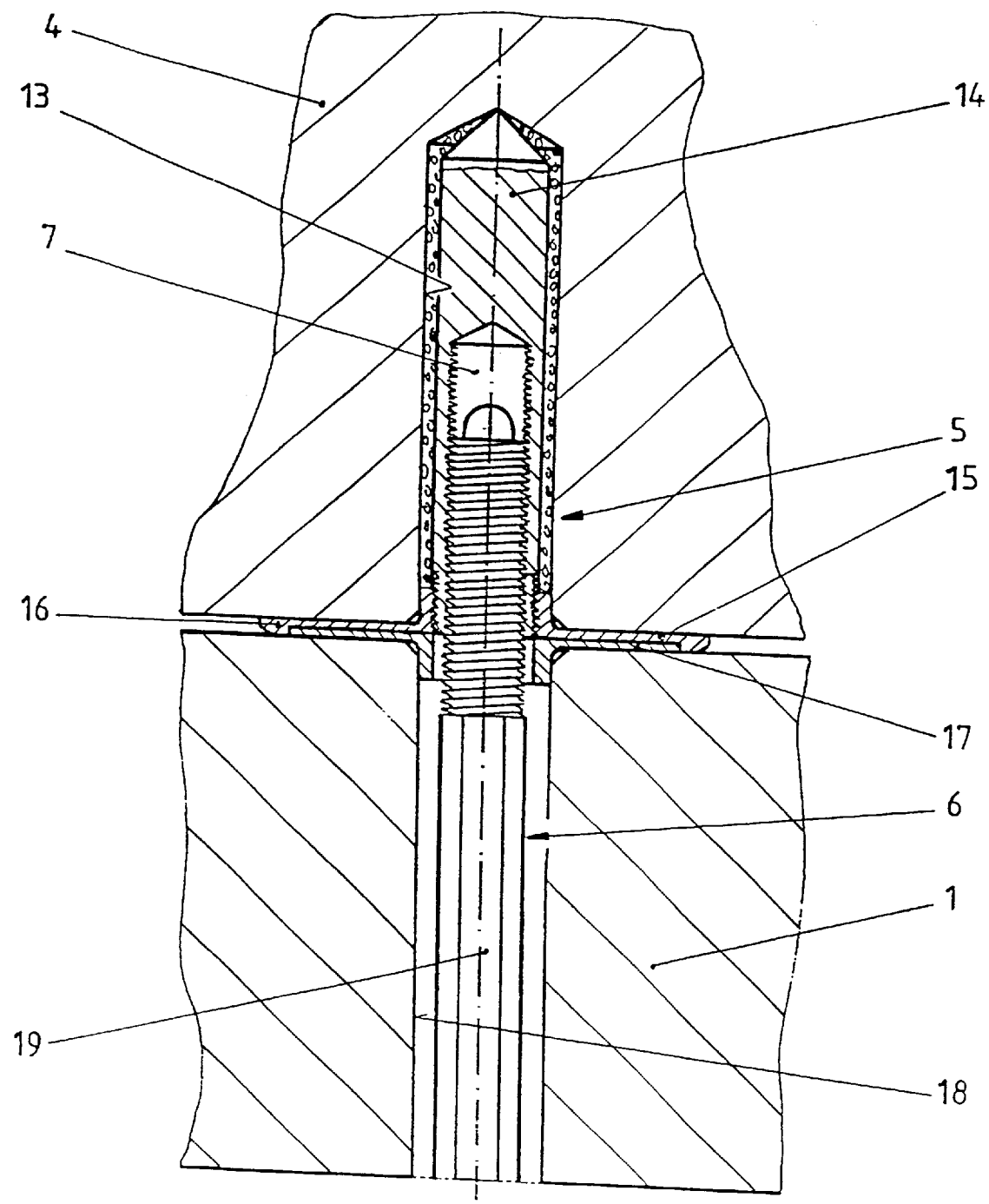
Figure 3:
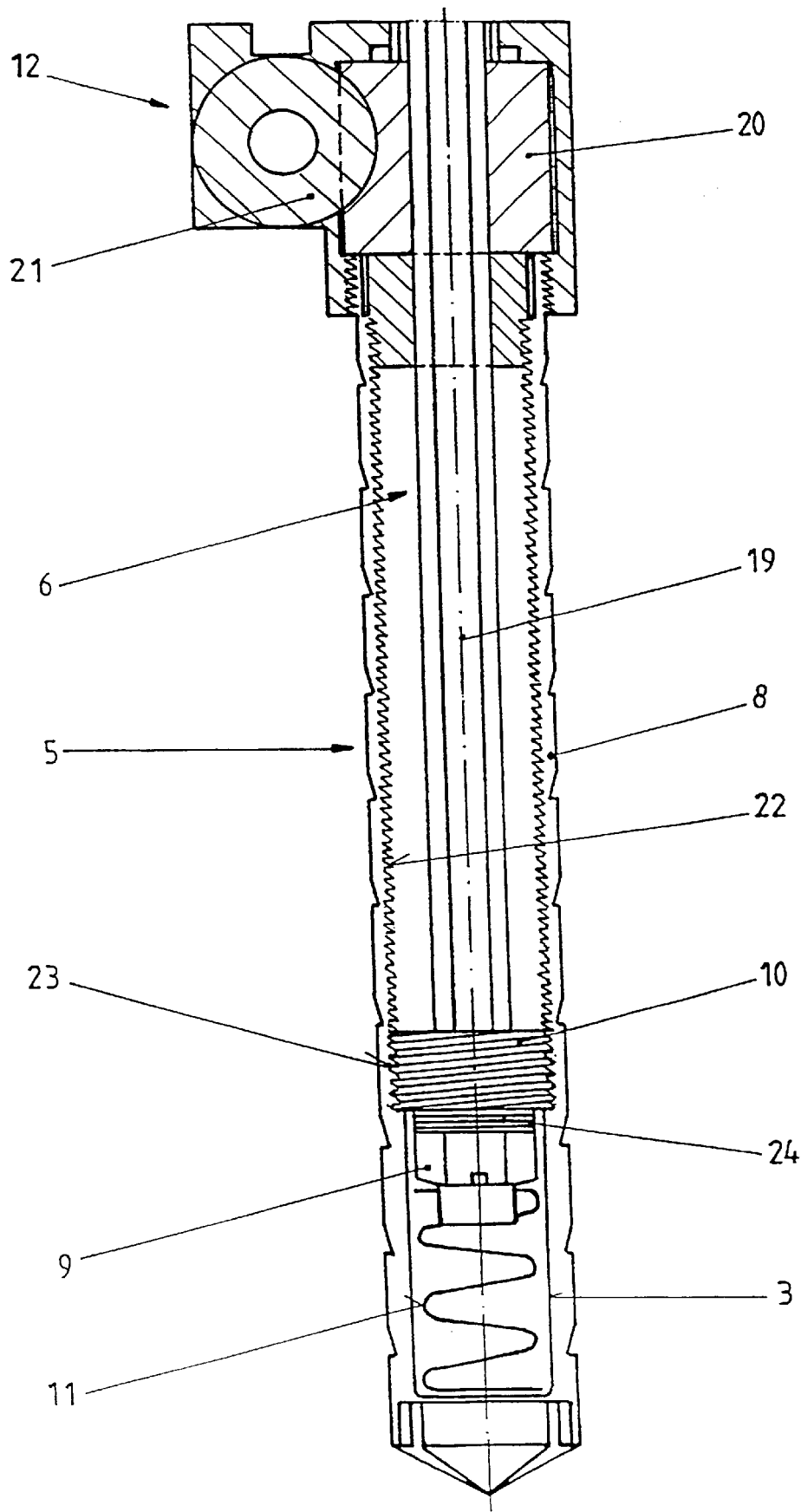

FIG. 1 a partially cut-away front view of a monument according to the invention, FIG. 2 a vertical section through an upper portion of the means for fastening the gravestone of the monument, FIG. 3 a vertical section through a bottom portion of the fastening means.

The monument shown in FIG. 1 has a base 1 which is mounted on a concrete foundation 2. On the base 1 stands a gravestone 4, which is held releasably on the latter by a fastening means 5. This fastening means 5 has a threaded spindle 6 which is screwed into a threaded bore 7 in the gravestone 4. This threaded spindle 6 passes through the base 1 and with its bottom end extends into a foundation tube 8. At its bottom end the threaded spindle 6 has a head 9 which in the position represented is in contact with an abutment 10 in the foundation tube 8. The abutment 10 might also be provided at the upper end of the foundation tube 8. It can also be an axially resilient component. A spring 11 in the form of a compression spring thrusts from the bottom against this head 9 and with its other end against the bottom of a spring cup 3 which is fixedly joined to the abutment 10. Thus, the spring 11 is supported for its action on the foundation tube 8 and always biases the threaded spindle 6 upwardly. A turning device 12 configured in this embodiment as a reduction drive serves for the rotation of the threaded spindle and is disposed directly beneath the base 1.

On a larger scale than in FIG. 1, FIGS. 2 and 3 show the fastening means 5, while the portion shown in FIG. 2 directly adjoins the top of the portion shown in FIG. 3. FIG. 2 indicates that a bore 13 leads from the bottom into the gravestone 4 and in it a sleeve 14 is cemented. This sleeve 14 has the open-bottom threaded bore 7 into which the threaded spindle 6 is screwed. A flange-like upper centering disk 15 is also fixed in the bottom of the bore 13; it has a circumferential, downwardly projecting margin 16 with which it encompasses a lower centering disk 17 which is fixed in a bore 18 of the base 1. These centering disks 15 and 17 assure that the threaded spindle 6 is precisely in line with the threaded bore 7 when the gravestone 4 is correctly placed on the base 1. FIG. 2 furthermore shows that the threaded spindle 6 has a hexagonally configured rotating portion 19 which reaches below the base 1, which is shown in FIG. 3.

FIG. 3 makes it clear that this turning portion 19 of the threaded spindle 6 passes through a drive gear 20 of the turning device 12, the passage through the wheel being so configured that the threaded spindle 6 can move axially through the drive gear 20. The drive gear 20, which can be in the form, for example, of a worm gear, can be rotated by a worm 21 which itself can be rotated with a tool through a rod, not shown, which is contained in a tube. The turning device 12 can also be configured differently. It is also possible for the threaded spindle 6 to be rotated at the rotation portion 19 by means of a common open-end wrench.

Likewise to be seen in FIG. 3 is the foundation tube 8. It has an internal thread 22 into which the abutment 10 in the form of a round nut with external thread 23 is screwed. It is thus possible by screwing the abutment 10 more or less far upward into the foundation tube to move the upper end of the threaded spindle 6 to adapt it to different heights of the base 1. Also to be seen in FIG. 3 is the spring cup 3 which is connected by screw threads to the abutment 10, which is in the form of a round nut. The head 9 is in the form of a nut which is likewise threaded onto the threaded spindle 6 and must be secured, in a manner not shown, against rotation. Between the head 9 and the abutment 10 a plurality of slip washers 24 is provided, which prevent the head 9 from turning together with the abutment 10 when the threaded spindle 6 is rotated and thereby adjusted.

As long as the gravestone 4 shown in FIG. 1 is not yet placed on the base 1, the threaded end of the threaded spindle 6 extends upwardly out of the base 1. If the gravestone 4 is placed on the base in the position shown in FIG. 1, the threaded spindle 6 is initially forced into the base 1 against the force of spring 11. Then the threaded spindle 6 is rotated by means of the turning device 12 and thus drives the threaded spindle 6 into the threaded bore 7. As soon as the head 9 reaches the abutment 10, the threaded spindle draws the gravestone 4 downward to the base 1, thus resulting in a tight fastening. If it is then found that the gravestone is out of plumb, the connection can be slightly loosened and shims, not shown, can be inserted into the seam 25 between the gravestone 4 and the base 1 and then the threaded spindle 6 can again be drawn tight.

I claim:

1. Monument comprising:

a base, a gravestone which is releasably fastened on the base and has a threaded bore in its bottom, a threaded spindle disposed in the base, a spring biasing said threaded spindle to an extended position so that an upper end of said threaded spindle extends out of the base when the gravestone is not mounted on said base, and an abutment determining said extended position, said threaded spindle being displaceable into the base against the force of the spring, wherein, in order to screw into the threaded bore, a lower end of the threaded spindle disposed in the base extends downwardly out of the base and is engageable by a turning device.

2. Monument according to claim 1, and further comprising a foundation tube with an internal thread that is to be inserted in a foundation of the monument, a bottom portion of said threaded spindle plunging into said foundation tube, the abutment determining the extended position of the threaded spindle being a round nut which has an external thread screwed into the internal thread of the foundation tube and carrying the threaded spindle with clearances, and a head on said threaded spindle which moves against the abutment from below.

3. Monument according to claim 2, characterized in that the head is formed by a nut screwed onto the threaded spindle and secured against rotation.

4. Monument according to claim 2, and further comprising at least one slip washer disposed between said head and said round nut.

5. Monument according to claim 1, wherein the threaded spindle has a turning portion configured as a hexagon underneath the base.

6. Monument according to claim 1, wherein the turning device is a drive disposed at a bottom of the base which has a drive wheel by which the threaded spindle is guided for axial displacement.

7. Monument according to claim 1, and further comprises a flange-like upper centering disk with a downwardly projecting margin disposed on a bottom of the gravestone and coaxial with the threaded bore, and a corresponding lower centering disk on an upper side of the base, coaxial with the threaded spindle, and encompassed by the margin of the upper centering disk.

8. Monument according to claim 7, wherein the threaded bore is provided in a sleeve inserted into a bore in the gravestone, the upper centering disk enters into said bore in the gravestone, and the lower centering disk is fixed in a bore penetrating the base through which the threaded spindle extends.

9. Monument according to claim 2, and further comprising a spring cup accommodating the spring fastened to the abutment within the foundation tube on a side of said abutment facing away from the gravestone, said spring resting against a bottom of the spring cup.

10. Monument according to claim 1, wherein the abutment is an axially resilient component.

* * * * *